Apr. 10, 1923.
C. CARSON
SPEEDOMETER
1,450,939
Filed Aug. 25, 1920 2 sheets-sheet 1
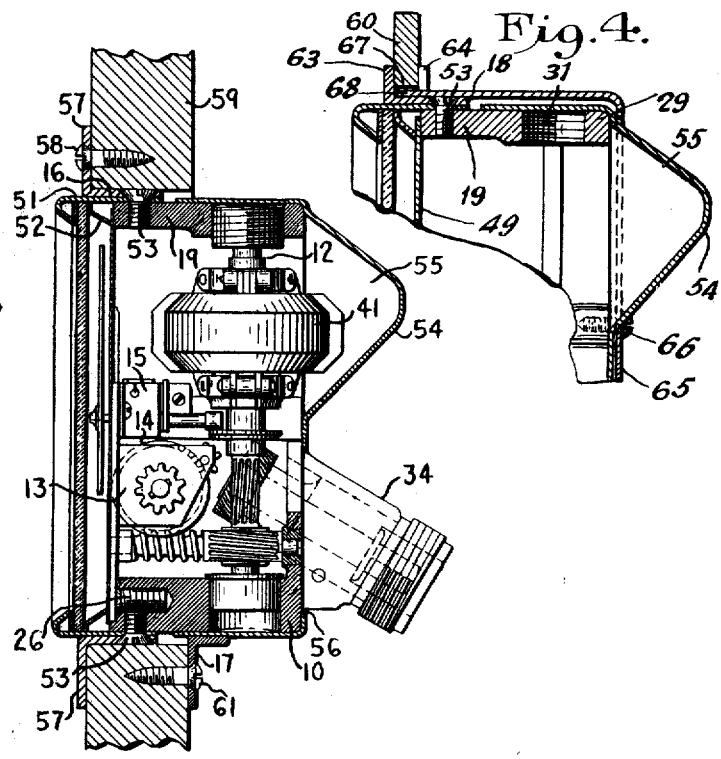
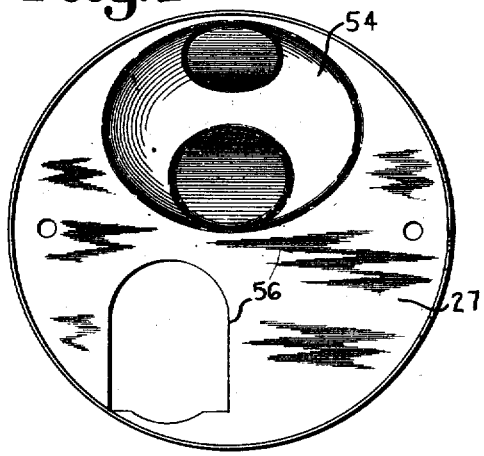
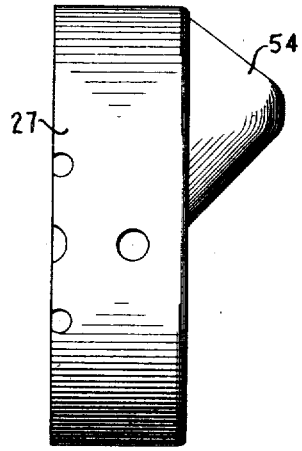
INVENTOR
Clarence Carson
BY
Warren S. Orton
ATTORNEY Apr. 10, 1923.  1,450,939
C. CARSON
SPEEDOMETER
Filed Aug. 25, 1920   2 sheets-sheet 2
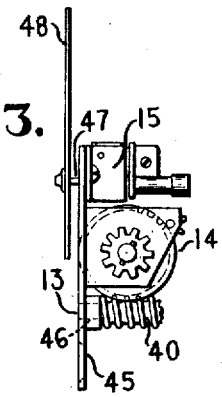
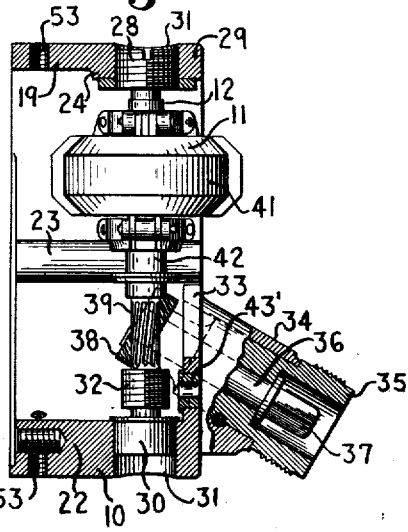
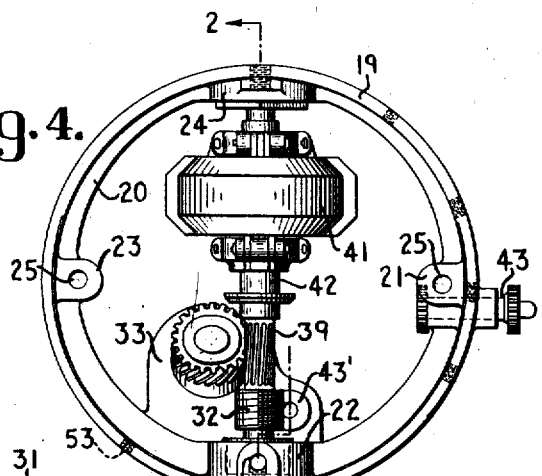
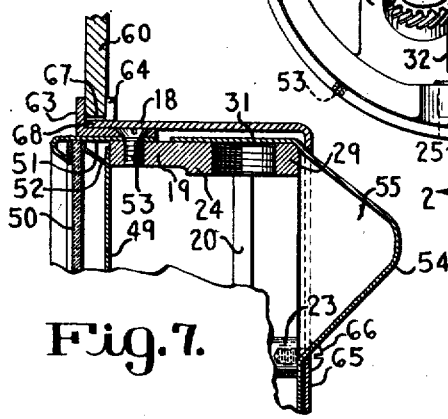
INVENTOR
Clarence Carson
BY
Warren S. Orton
ATTORNEY Patented Apr. 10. 1923.

1,450,939

UNITED STATES PATENT OFFICE.

CLARENCE CARSON, OF NEW ROCHELLE, NEW YORK, ASSIGNOR TO JOHNS-MANVILLE, INCORPORATED, A CORPORATION OF NEW YORK.

SPEEDOMETER.

Application filed August 25, 1920. Serial No. 405,999.

*To all whom it may concern:*

Be it known that I, CLARENCE CARSON, a citizen of the United States, and resident of New Rochelle, in the county of Westchester and State of New York, have invented certain new and useful Improvements in Speedometers, of which the following is a specification.

The invention relates in general to an indicating instrument of the type actuated by a rotating member and which may be a tachometer, an odometer, or a combination of such instruments, and the invention relates specifically to a means for mounting different size instruments to a support.

One of the primary objects of the invention is to assure an economic production of a plurality of different instruments by simplifying and standardizing certain units and by a proper selection of the least possible number of stock parts so as to permit unskilled labor to assemble any one of the possible forms of instrument at low cost and without the necessity of carrying a large stock of separate parts.

It is appreciated that in the art of devices of the class indicated different types of instruments are required in the trade to meet different commercial conditions. It is necessary to provide not only different reading scales for use therewith, but it is also necessary to provide different types of casings for mounting the instruments on differently designed supports, such as dashboards of varying thicknesses and the different instrument boards now found on airplanes, automobiles and like structures on which such instruments are mounted.

The present invention contemplates the designing of a basic unit constituting the major portion of the completed instrument, preferably in the form of a rugged casting which will have permanently mounted thereon certain standard parts common to the different types of instruments. This basic unit will be provided with localizing and attaching elements arranged to receive different types of odometer and tachometer mechanisms and coact therewith so as to modify the basic unit to meet the call for any particularly type of instrument. It is also within the scope of the invention to construct the basic unit so that it will receive different standardized types of mounting parts thereby to accommodate the assembled instrument to the different types of supports upon which it is usual to mount such instruments.

Another object of the invention, and still featuring economy in manufacturing cost is to provide for such a distribution of material that the basic casting or unit which forms the main part of all of the several instruments shall be designed to carry and distribute practically all strains on the instrument and in which the covers and attaching parts shall be made up as cheap stampings from relatively light stock not intentionally designed to receive stresses and strains.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a vertical sectional view taken axially through a preferred embodiment of the invention constituting a completely assembled and mounted combined tachometer and odometer and illustrating two means for mounting the same in position;

Figures 2 and 3 are respectively rear and side views of the back cover shown in section in Figure 1; and Figure 4 is a fragmentary view of the upper portion of the device shown in Figure 1, illustrating a modified means for mounting the same in place.

In the following description and in the claims, parts will be identified by specific names for convenience of expression but they are intended to be as generic in their application to similar parts as the art will permit.

Referring to the accompanying drawings, it is noted that the device comprises a ring-casting 10 with a dial plate front and rear covers, shown in Figure 1, a governor 11 together with its drive shaft 12, an indicating mechanism 13 which includes odometer mechanism 14 driven from the governor and a tachometer mechanism 15 actuated by the governor and one or more mounting plates or rings 16, 17 and 18 (see Figures 1 and 4).

The casting 10 is provided with tapped holes 25 adapted to receive screws 26 for securing the indicating mechanism unit 13 to the front end and to secure the back cover 27 to the rear end of the casting.

The front end of the casting is closed by a glass cover 50 held in place by a glass ring 52 and which includes a band 51 telescoping the casting and held thereto by screws 53 which pass into screw holes formed in the casting.

The rear cover 27 is in the form of a thin sheet metal stamping and is provided with a bulging part 54 stamped therefrom to form an outwardly positioned pocket 55 designed to accommodate the weights of the governor when in active, distended position. The rear cover is also provided with an opening 56 through which extends the drive shaft neck 34. The opening is so designed that its outline projected onto the plate will fall within the outline of the plate so that the plate, together with the neck, will cover the opening and thus prevent the entrance of dirt, dust or other foreign matter into the device from the rear end thereof.

In operation the device works as is usual with such instruments, power is supplied by the drive shaft to rotate the governor shaft at high speed. The governor actuates the tachometer mechanism in those cases where such mechanism is included and acts through the odometer shaft to cause the counting elements to function. It is usual to mount such instruments more securely than by a frictionally tight fit and the present disclosure features, in connection with the basically formed instrument, certain attachments which may be kept in stock and sold with any particular instrument to mount the same in the desired location.

One such attachment designed to be utilized where a flush mounting is desired, includes the mounting ring 16 of a size to telescope the casting or to telescope the glass retaining ring, and in either case secured thereto by the screws 53 which are used to fasten the glass ring, all as shown in Figure 1. The mounting ring 16 is provided with an outwardly extending securing flange 57 provided with screw holes designed to receive wood or machine screws 58 for fastening the same to the front side of a support 59. This support may be the dashboard shown in Figure 1 and which is usually of different widths or may be the metal instrument board 60 shown in Figure 4.

It is also suggested that the instrument be mounted either with or without the front mounting ring 16 by a securing means which engages the rear side of the support. One such means is shown in the ears 17 which are in the form of L-shaped brackets one flange of each of which is welded to the rear cover. The lugs are spaced circumferentially about the rear cover and are each secured by means of screws 61 to the rear side of the support.

Under some circumstances it is desired to mount the device in position without the necessity of using screws and one such showing is disclosed in Figure 4 where the mounting ring has its flange 63 for engaging the front side of the support of reduced width from the similar showing in Figure 1 as there is no need to provide space for screw holes. It is obvious that the ears 17 of the showing in Figure 1 may be formed into a continuous band for engaging the rear side of the support and which may be part of the rear cover or, as shown in Figure 4, may be formed as a flange 64 constituting an integral part of a separate rear cover 65 herein identified as a clamping cup. The clamping cup is secured by bolts 66 which pass through the cup and through the rear cover, in case a rear cover is used. By drawing up on the bolts 66 it is possible to advance the ears or flange 64 into firm bearing engagement with the rear side of the support and thus clamp the support between the two mounting rings.

It is further suggested that in order to prevent rotary movement of the instrument as a whole while mounted in the support, the support be provided with a slot 67 and the flange 64 be provided with a finger 68 for engaging in the slot.

Having thus described my invention, I claim:

1. A device of the class described for mounting an indicating mechanism including a front mounting ring provided with means for securing the same to the mechanism and including an outstanding flange for engaging the front side of the support for the device and a rear cover provided with separate means for securing the same to the mechanism and also provided with an outstanding flange for engaging the rear side of the support whereby the support is disposed between two flanges projecting independently of each other from the mechanism.

2. A device for mounting a cylindrical form of indicating mechanism including a cylindrical band adapted to be fitted to the mechanism and means carried by the band and adapted to engage the support for the device to prevent rotary movement of the band.

3. A device for mounting an indicating mechanism including means for clamping the device to the support and provided with a finger for preventing turning of the device relative to the support.

4. A device for mounting an indicating mechanism including a rear cover provided with means for securing the same to the mechanism and provided with means for preventing movement of the cover relative to the mounting.

5. A device for mounting an indicator mechanism including a clamping cup adapted to telescope the mechanism and provided with a pocket to receive part of the indicator mechanism, said cup adapted at its front edge to engage the mounting for the device and means for securing the cup in proper position relative to the mechanism and for securing the cup in position engaging the mounting.

Signed at N. Y., in the county of N. Y. and State of N. Y., this 16 day of August, A. D. 1920.

CLARENCE CARSON.